US011531012B2

(12) United States Patent
Maeda et al.

(10) Patent No.: US 11,531,012 B2
(45) Date of Patent: Dec. 20, 2022

(54) CHROMATOGRAPH MASS SPECTROMETER

(71) Applicant: SHIMADZU CORPORATION, Kyoto (JP)

(72) Inventors: Kazuma Maeda, Kyoto (JP); Toshiya Matsubara, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 17/479,073

(22) Filed: Sep. 20, 2021

(65) Prior Publication Data
US 2022/0155268 A1    May 19, 2022

(30) Foreign Application Priority Data
Nov. 16, 2020 (JP) .............................. JP2020-190526

(51) Int. Cl.
H01J 49/00 (2006.01)
G01N 30/72 (2006.01)
G01N 30/86 (2006.01)

(52) U.S. Cl.
CPC ..... G01N 30/7233 (2013.01); G01N 30/8631 (2013.01); H01J 49/005 (2013.01); H01J 49/0031 (2013.01); H01J 49/0036 (2013.01)

(58) Field of Classification Search
CPC ............ G01N 30/7233; G01N 30/8631; H01J 49/0031; H01J 49/0036; H01J 49/005
(Continued)

(56) References Cited

U.S. PATENT DOCUMENTS 8,809,770 B2 * 8/2014 Bonner ............... H01J 49/0045
250/281
2020/0152434 A1   5/2020 Yamamoto et al.

FOREIGN PATENT DOCUMENTS

WO    2019/012589 A1    1/2019

* cited by examiner

Primary Examiner — Michael Maskell
(74) Attorney, Agent, or Firm — Sughrue Mion, PLLC

(57) ABSTRACT

In a chromatograph mass spectrometer having a measurement unit (1) including a chromatograph is combined with a tandem mass spectrometry section capable of an MS/MS analysis, a controller (40) performs chromatograph mass spectrometry by controlling the measurement unit so as to operate the tandem mass spectrometry section to cyclically perform analysis cycles, where each of the analysis cycles includes a first mass spectrometric analysis in which a measurement of ions is performed over a predetermined m/z range and an MS/MS analysis by DIA in which ions included within each of a plurality of windows formed by dividing the m/z range are designated as a precursor ion. A window selector (42, 43) selects, during an execution of an analysis cycle, a window among the plurality of windows for an MS/MS analysis by DDA which is irregularly performed in an ongoing analysis cycle, based on intensity information obtained for each of the plurality of windows from an MS/MS spectrum acquired by the MS/MS analysis by DIA. A precursor-ion determiner (44) determines a precursor ion corresponding to the window selected by the window selector in a mass spectrum acquired by the first mass spectrometric analysis in the ongoing analysis cycle, based on peak information included within the m/z range of the window. A data-dependent-acquisition condition setter (45) informs the controller of the precursor ion determined by the precursor-ion determiner, as the precursor ion for the MS/MS analysis (Continued)

by DDA which is irregularly performed in the ongoing analysis cycle.

5 Claims, 5 Drawing Sheets

(58) Field of Classification Search
USPC .............................. 250/281, 282; 702/22–28
See application file for complete search history.

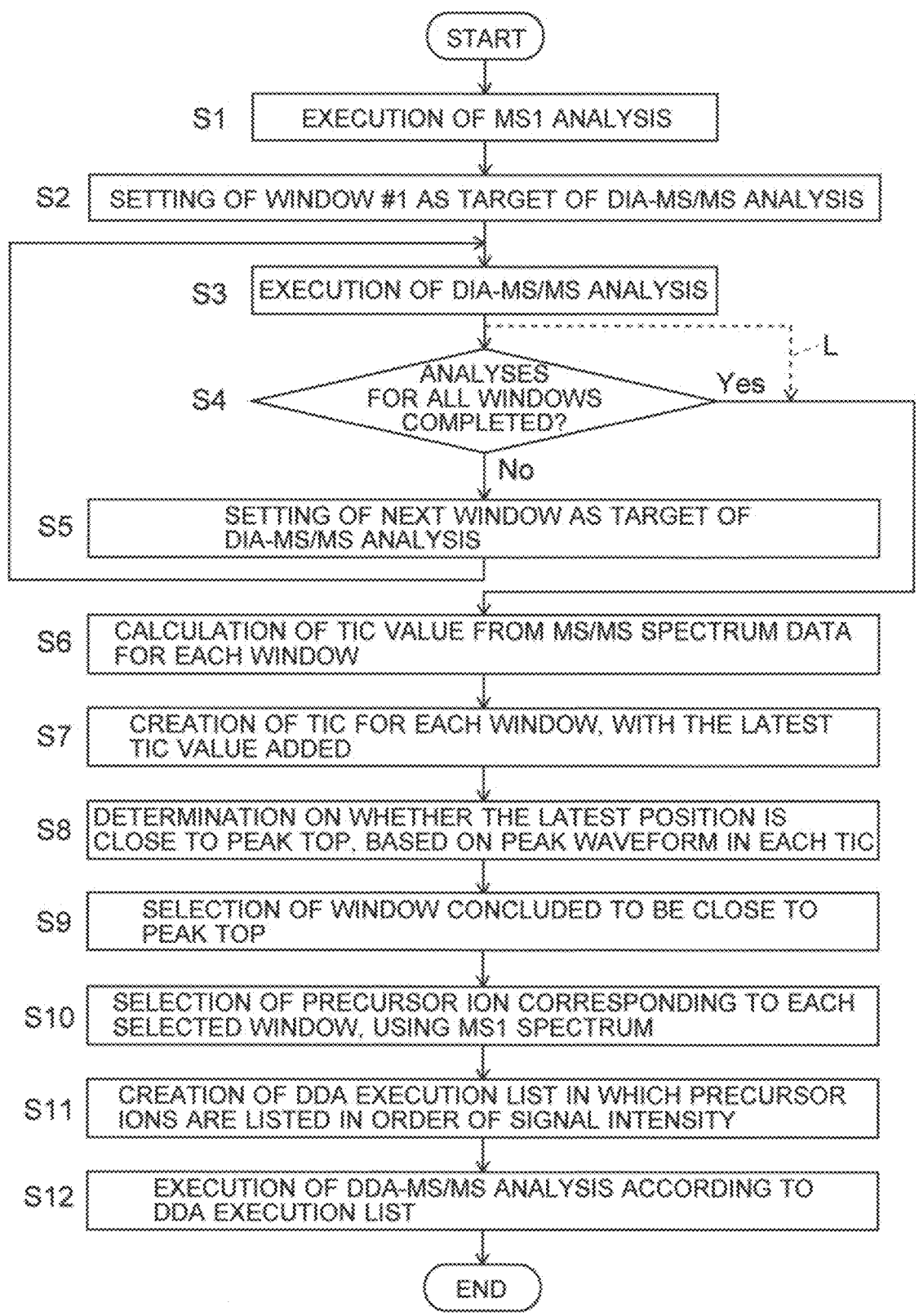

CHROMATOGRAPH MASS SPECTROMETER

TECHNICAL FIELD

The present invention relates to a chromatograph mass spectrometer in which a tandem mass spectrometer capable of an MS/MS (=$MS^2$) analysis is used as a detector for a chromatograph.

BACKGROUND ART

In recent years, the use of liquid chromatograph mass spectrometers (LC-MSs) which employ a tandem mass spectrometer as a detector has been rapidly increasing in various areas which require qualitative and quantitative analyses of multiple components, such as the testing of residual agricultural chemicals in food products, testing of contaminants in environmental water, or exhaustive analysis of metabolites in biological samples. In particular, a quadrupole time-of-flight mass spectrometer (Q-TOF mass spectrometer), which uses a time-of-flight mass separator as the rear-stage mass separator, can perform a measurement with higher levels of mass accuracy and mass-resolving power than commonly used triple quadrupole mass spectrometers, and therefore, has exhibited its effectiveness in the qualitative and quantitative determination of compounds contained in a complex sample. It should be noted that the terms "liquid chromatograph mass spectrometer" and "LC-MS" as used hereinafter in the present description mean a device in which a tandem mass spectrometer is used as the detector.

Data dependent acquisition (DDA, which is also called a "shotgun" method) and data independent acquisition (DIA) have conventionally been known as data acquisition techniques for exhaustively analyzing multiple components in a sample by using an LC-MS (see Patent Literature 1, 2 or other related documents).

In the DDA, a normal type of mass spectrometric analysis which includes no dissociation of ions (this type of analysis may be hereinafter called the "MS1 analysis") is initially performed to acquire a mass spectrum over a predetermined range of mass-to-charge ratio (strictly speaking, this should be noted as "m/z" in italic type, although the term "mass-to-charge ratio" or "m/z" is used in this description according to common practices). A mass spectrum acquired by an MS1 analysis is hereinafter called the "MS1 spectrum". Subsequently, one or more ion peaks which satisfy a given condition, such as the signal intensity being equal to or higher than a specific threshold, are selected from the peaks observed in the MS1 spectrum. Then, the MS1 analysis is once more performed, and an MS/MS analysis in which an ion or ions corresponding to the selected ion peak or peaks are designated as a precursor ion or ions is subsequently performed, targeting at ions which fall within a narrow range of mass-to-charge ratios including each precursor ion, to acquire an MS/MS spectrum in which a wide variety of product ions are observed.

On the other hand, in the SWATH (Sequential Window Acquisition of all THeoretical fragment ion spectra mass spectrometry)® method, which is a representative technique of the DIA, the entire mass-to-charge-ratio range for the measurement is divided into narrower mass-to-charge-ratio widths, to set a plurality of windows. While those windows are sequentially and individually selected, ions whose mass-to-charge ratios are included within each mass-to-charge-ratio width are collectively selected as precursor ions, and the product ions generated from those precursor ions are exhaustively scanned to acquire an MS/MS spectrum for each window. The mass-to-charge-ratio width of each window is normally within a range from a few Da to tens of Da.

CITATION LIST

Patent Literature

Patent Literature 1: WO 2019/012589 A
Patent Literature 2: U.S. Pat. No. 8,809,770 B

SUMMARY OF INVENTION

Technical Problem

In the DDA, the mass-to-charge-ratio range from which the precursor ion is selected for the MS/MS analysis is extremely narrow. Therefore, it is easy to obtain a high-purity MS/MS spectrum in which product ions originating from a single ion species of interest are observed. However, when there are a large number of components contained in the eluate introduced into the mass spectrometer so that an excessive number of ion peaks appear in the MS1 spectrum, it may be impossible to obtain MS/MS spectra for some of the components since there is a limitation on the number of precursor ions on which an MS/MS analysis can be performed in a practically simultaneous manner. In other words, some components may be overlooked in the detection process, and the exhaustiveness of the analysis may be low. One method for avoiding this situation is to increase the number of precursor ions for which a practically simultaneous MS/MS analysis can be performed. However, this will lead to an excessively large number of MS/MS analyses which will be performed on the basis of a single MS1 spectrum, so that the sampling period of the data will be considerably long. Consequently, the MS1 spectrum may not be acquired at a point in time where the concentration of one component is sufficiently high, in which case the quantitative performance will be low.

By comparison, in the case of the DIA, since the windows are set so as to cover the entire mass-to-charge-ratio range for the measurement, the product-ion information for all components can be obtained even when a large number of components are simultaneously introduced into the mass spectrometer. That is to say, the DIA analysis is more exhaustive than the DDA analysis. However, since the mass-to-charge-ratio width of each individual window is wider than the mass-to-charge-ratio range from which the precursor ion is selected in the DDA, it is possible that ions originating from two or more different components fall within the same window. In that case, the product ions generated from two or more ion species will be mixed with each other in the MS/MS spectrum. In other words, the degree of purity of the MS/MS spectrum is low. In this respect, the quality of the MS/MS spectrum is lower than in the case of the DDA.

The present invention has been developed to solve those problems. Its primary objective is to provide a chromatograph mass spectrometer capable of acquiring a high-quality MS/MS spectrum with a high degree of purity while achieving a high level of exhaustiveness.

Solution to Problem

One mode of the chromatograph mass spectrometer according to the present invention developed for solving the previously described problem includes:

a measurement unit in which a chromatograph and a tandem mass spectrometry section capable of an MS/MS analysis are combined together;

a controller configured to perform a chromatograph mass spectrometric analysis by controlling the measurement unit so as to operate the tandem mass spectrometry section to cyclically perform analysis cycles, where each of the analysis cycles includes at least a first mass spectrometric analysis in which a measurement of ions is performed over a predetermined mass-to-charge-ratio range and an MS/MS analysis by data independent acquisition in which ions included within each of a plurality of windows formed by dividing the mass-to-charge-ratio range are designated as a precursor ion;

a window selector configured to select, during an execution of an analysis cycle, a window among the plurality of windows for an MS/MS analysis by data dependent acquisition which is irregularly performed in an ongoing analysis cycle, based on intensity information obtained for each of the plurality of windows from an MS/MS spectrum acquired by the MS/MS analysis by data independent acquisition;

a precursor-ion determiner configured to determine a precursor ion corresponding to the window selected by the window selector in a mass spectrum acquired by the first mass spectrometric analysis in the ongoing analysis cycle, based on peak information included within the mass-to-charge-ratio range of the window; and a data-dependent-acquisition condition setter configured to inform the controller of the precursor ion determined by the precursor-ion determiner, as the precursor ion for the MS/MS analysis by data dependent acquisition which is irregularly performed in the ongoing analysis cycle.

The chromatograph may be a liquid chromatograph or gas chromatograph. The tandem mass spectrometry section may be a quadrupole time-of-flight mass spectrometer, ion trap time-of-flight mass spectrometer, ion trap mass spectrometer, triple quadrupole mass spectrometer, or other appropriate types of mass spectrometers.

In the previously described mode of the chromatograph mass spectrometer according to the present invention, as soon as an MS/MS analysis by DIA in one analysis cycle (hereinafter simply referred to as "cycle") has been completed, the window selector selects one or more windows which should be the target of the MS/MS analysis by DDA which is irregularly performed in the same cycle, based on the intensity information obtained from an MS/MS spectrum acquired for each window. It is possible that no window is thereby selected. The precursor-ion determiner determines a precursor ion for each selected window, using a mass spectrum acquired by the first mass spectrometric analysis. After the precursor ion has been determined, the data-dependent-acquisition condition setter informs the controller of that ion as the precursor ion for the MS/MS analysis by DDA. The controller performs the MS/MS analysis by DDA according to the information.

When no window was selected from the analysis result obtained by DIA, or when no suitable precursor ion could be determined for the selected window, no MS/MS analysis by DDA will be performed in the cycle concerned. In this sense, the MS/MS analysis by DIA is a regular MS/MS analysis which are always performed in every cycle, while the MS/MS analysis by DDA is an irregular MS/MS analysis which may not be performed in some cycles depending on the circumstances.

Advantageous Effects of Invention

In the previously described mode of the chromatograph mass spectrometer according to the present invention, the precursor ion to be subjected to the MS/MS analysis by DDA is determined based on the intensity information of the ions within each window obtained from an MS/MS spectrum created by the MS/MS analysis by DIA in each cycle, i.e., based on the concentration (abundance) of the components included in each window. In normal cases, the mass-to-charge-ratio width of the window is far smaller than the entire mass-to-charge-ratio range to be covered by the measurement in a chromatograph mass spectrometric analysis. The search for the precursor ion in each window is performed using an independent criterion which is unaffected by other windows. Therefore, even when the concentration (abundance) of the component included within each window significantly varies from one window to another, it is possible to acquire an MS/MS spectrum by DDA at an appropriate timing for each component, e.g., at a point in time where the concentration is comparatively high.

Thus, by the previously described mode of the chromatograph mass spectrometer according to the present invention, an MS/MS spectrum with a high degree of purity and high level of sensitivity can be obtained even for a component whose abundance in the sample is comparatively low. Furthermore, by the previously described mode of the chromatograph mass spectrometer according to the present invention, an MS/MS spectrum for each of the windows which assuredly cover the entire mass-to-charge-ratio range for the measurement can be obtained even when a constraint is placed on the analysis speed of the tandem mass spectrometry section for some reasons, e.g., in order to fulfill the requirement that a chromatogram which ensures a satisfactory level of quantitative performance can be obtained. Consequently, the exhaustiveness of the analysis can be ensured. That is to say, the previously described mode of the chromatograph mass spectrometer according to the present invention can acquire a high-quality MS/MS spectrum with a high degree of purity while achieving a high level of exhaustiveness.

BRIEF DESCRIPTION OF DRAWINGS

FIG. 3 is a flowchart of the control-processing operation during the execution of one cycle of analyses in the LC-MS according to the present embodiment.

DESCRIPTION OF EMBODIMENTS

An LC-MS as one embodiment of the chromatograph mass spectrometer according to the present invention is hereinafter described with reference to the attached drawings.

[Configuration of LC-MS According to Present Embodiment]

Figure 1:
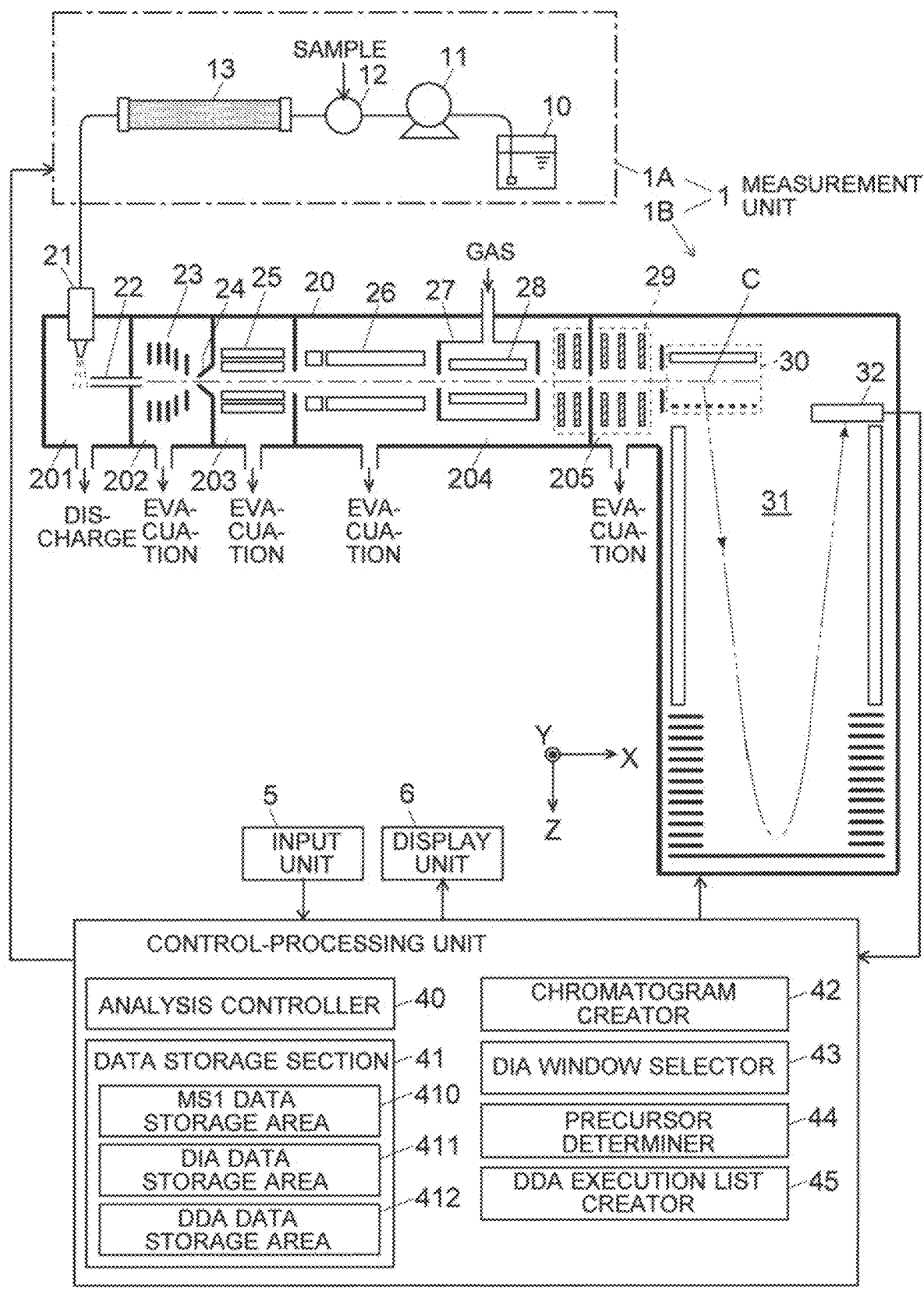
FIG. 1 is a schematic configuration diagram of an LC-MS as one embodiment of the present invention.

FIG. 1 is a schematic configuration diagram of the LC-MS according to the present embodiment.

As shown in FIG. 1, this LC-MS includes a measurement unit 1, control-processing unit 4, input unit 5 and display unit 6. The measurement unit 1 includes a liquid chromatograph (LC) section 1A and a mass spectrometry (MS) section 1B.

The LC section 1A includes a mobile phase container 10 for holding a mobile phase, a liquid supply pump 11 configured to draw and supply the mobile phase, an injector 12 configured to inject a sample liquid into the mobile phase, and a column 13 configured to temporally separate various compounds contained in the sample liquid.

The MS section 1B is a quadrupole time-of-flight (Q-TOF) mass spectrometer. It includes an ionization chamber 201 maintained at substantially atmospheric pressure and a vacuum chamber 20 whose inner space is divided into four compartments. Formed within the vacuum chamber 20 are a first intermediate vacuum chamber 202, second intermediate vacuum chamber 203, first high vacuum chamber 204 and second high vacuum chamber 205. These chambers are individually evacuated by vacuum pumps (turbomolecular pump and rotary pump, which are not shown) so that their degrees of vacuum increase in the mentioned order. That is to say, the MS section 1B has the configuration of a multi-stage differential pumping system.

The ionization chamber 201 is equipped with an electrospray ionization (ESI) probe 21 which is supplied with an eluate from the exit end of the column 13. The ionization chamber 201 communicates with the first intermediate vacuum chamber 202 through a thin desolvation tube 22. The first intermediate vacuum chamber 202 communicates with the second intermediate vacuum chamber 203 through an orifice formed at the apex of a skimmer 24. Ion guides 23 and 25 are arranged within the first and second intermediate vacuum chambers 202 and 203, respectively.

The first high vacuum chamber 20 contains a quadrupole mass filter 26 and a collision cell 27 within which an ion guide 28 is provided. The plurality of electrodes arranged across the boundary between the first and second high vacuum chambers 204 and 205 form an ion guide 29. The second high vacuum chamber 205 contains an orthogonal acceleration time-of-flight mass separator and an ion detector 32, where the mass separator includes an orthogonal accelerator 30 and an ion flight section 31 having a reflectron.

The control-processing unit 4 includes an analysis controller 40, data storage section 41, chromatogram creator 42, DIA window selector 43, precursor determiner 44, and DDA execution list creator 45 as its functional blocks. An MS1 data storage area 410, DIA data storage area 411, and DDA data storage area 412 are provided in the data storage section 41.

In normal cases, the control-processing unit 4 is actually a personal computer, workstation or similar type of device, on which the aforementioned functional blocks can be embodied by running, on the computer, one or more pieces of dedicated software (computer programs) installed on the same computer. This type of computer program can be offered to users in the form of a non-transitory computer readable medium recording the program, such as a CD-ROM, DVD-ROM, memory card, or USB memory (dongle). It may also be offered to users in the form of data transferred through the Internet or similar communication networks. The program can also be preinstalled on a computer to be included in a system before a user purchases the system.

[Overview of LC/MS Analysis Operation in LC-MS According to Present Embodiment]

The analysis controller 40 controls the measurement unit 1 according to a measurement method prepared beforehand to perform an LC/MS analysis on a prepared sample and collect LC/MS data on the sample. An LC/MS analysis operation performed under the control of the analysis controller 40 is hereinafter described.

In this LC-MS, the LC section 1A performs a normal type of LC separating operation. Specifically, in the LC section 1A, the liquid supply pump 11 draws the mobile phase from the mobile phase container 10 and supplies it to the column 13 at a substantially constant flow rate. According to an instruction from the analysis controller 40, the injector 12 injects a sample liquid into the mobile phase at a predetermining timing. The injected sample is carried by the flow of the mobile phase and introduced into the column 13. While the sample is passing through the column 13, the compounds in the sample are temporally separated from each other. After the point in time of the sample injection, various compounds contained in the sample appear in the eluate from the exit end of the column 13 either individually or in a superposed form with other compounds.

The eluate is introduced into the ESI probe 21 in the MS section 1B. The ESI probe 21 sprays the eluate into the ionization chamber 201 while imparting imbalanced electric charges to the eluate. The electrically charged droplets produced by the spraying come in contact with the high-temperature gas in the surrounding area and are thereby broken into smaller droplets. When the solvent in the droplets is vaporized, the compounds in the droplets are turned into gaseous ions. The generated ions are transferred through the desolvation tube 22 into the first intermediate vacuum chamber 202. After travelling through the ion guide 23, skimmer 24 and ion guide 25 in the mentioned order, the ions are introduced into the quadrupole mass filter 26 in the first high vacuum chamber 204.

In the MS section 1B, either an MS1 analysis or MS/MS analysis is performed, as will be described later.

In the case of the MS1 analysis, the ions sent into the first high vacuum chamber 204 are allowed to almost directly pass through the quadrupole mass filter 26 and the collision cell 27 (typically, only an RF voltage for transporting ions is to the quadrupole mass filter 26), to be transported to the orthogonal accelerator 30. In the case of the MS/MS analysis, the rod electrodes forming the quadrupole mass filter 26 are individually supplied with a predetermined voltage consisting of an RF voltage superposed on a DC voltage, so that only an ion species having a specific mass-to-charge ratio depending on the applied voltage, or only ion species included within a specific mass-to-charge-ratio range depending on the applied voltage, are selected as a precursor ion or ions and pass through the quadrupole mass filter 26. Meanwhile, a collision gas, such as argon gas, is introduced into the collision cell 27. The precursor ion collides with the collision gas and are thereby fragmented into various kinds of product ions by collision induced dissociation. The resultant product ions are transported through the ion guide 29 into the orthogonal accelerator 30.

In the orthogonal accelerator 30, the ions are simultaneously accelerated in a specific direction (Z-axis direction) substantially orthogonal to their incident direction (X-axis direction). The accelerated ions fly at speeds which depend on their respective mass-to-charge ratios. After flying in a round-trip path within the ion flight section 31 as indicated by the alternate long and two short dashes line in FIG. 1, the ions reach the ion detector 32. The various ions which simultaneously departed from the orthogonal accelerator 30 arrive at and are detected by the ion detector 32 in ascending order of mass-to-charge ratio. The ion detector 32 produces ion-intensity signals according to the amount of incident ions and send those signals to the control-processing unit 4.

In the control-processing unit 4, the data storage section 41 converts the ion-intensity signals into digital data, and converts the time of flight of each ion (as measured from the point in time of the ejection of the ions from the orthogonal accelerator 30) into mass-to-charge ratio to obtain mass spectrum data (raw data). Those pieces of data are stored in one of the storage areas 410-412. The data thus stored are the data from which an MS1 spectrum or MS/MS spectrum is to be obtained.

[MS/MS Analysis Operation Characteristic of LC-MS According to Present Embodiment]

In the LC-MS according to the present embodiment, after a sample liquid has been injected in the LC section 1A, the analysis controller 40 controls the MS section 1B as follows.

Figure 2:
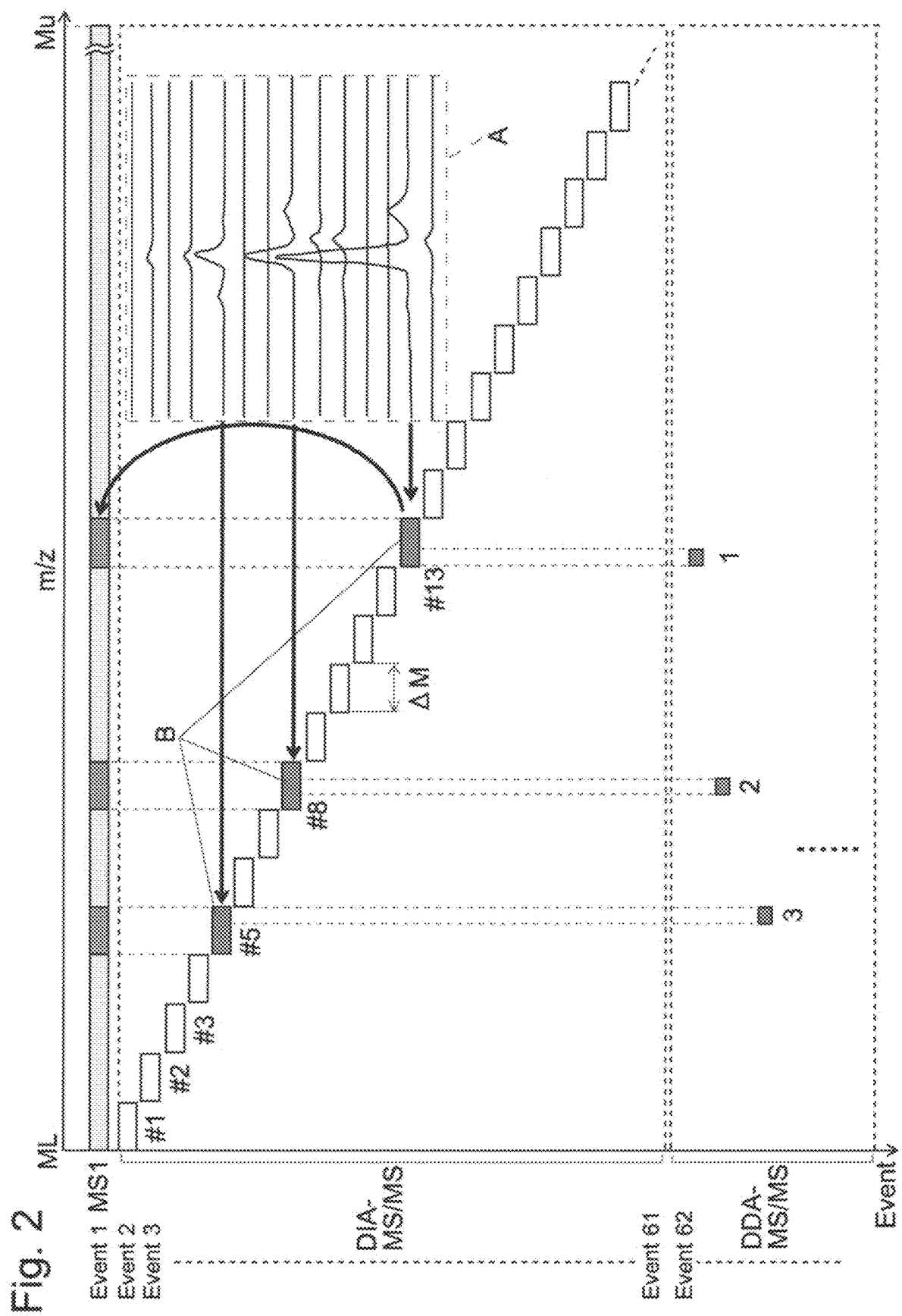
FIG. 2 is a model diagram for explaining the contents of an MS1 analysis and MS/MS analysis to be performed in one cycle in the LC-MS according to the present embodiment.

FIG. 2 is a model diagram for explaining the contents of an MS1 analysis and MS/MS analysis to be performed in one cycle in the LC-MS according to the present embodiment. This cycle is repeated from the beginning of the measurement (beginning of the data acquisition) to the end of the measurement.

In FIG. 2, the vertical axis indicates event numbers each of which corresponds to one unit of the mass spectrometric analysis to be performed within one cycle. The analysis is sequentially performed in order of those event numbers, i.e., from top to bottom in FIG. 2. The horizontal axis in FIG. 2 indicates the mass-to-charge ratio, m/z. In the case of the MS1 analysis, this axis shows the entire mass-to-charge-ratio range to be covered by the measurement. In the case of the MS/MS analysis, the axis shows the mass-to-charge-ratio range from which a precursor ion is to be selected. Panel "A" in FIG. 2 conceptually shows individual chromatograms to be created for some events.

As shown in FIG. 2, one cycle includes one MS1 analysis, a plurality of MS/MS analyses by data independent acquisition ("DIA-MS/MS analyses"), and a plurality of MS/MS analyses by data dependent acquisition ("DDA-MS/MS analyses").

In the MS1 analysis, a predetermined mass-to-charge-ratio range ML-Mu is set as the target of the measurement. This MS1 analysis is performed as "Event 1" at the beginning of each cycle. In the present example, the mass-to-charge-ratio range ML-Mu for the measurement is m/z 300-1500.

After the MS1 analysis, the DIA-MS/MS analysis (SWITH method) is performed. In the present example, the predetermined mass-to-charge-ratio range ML-Mu is divided into a plurality of windows having a predetermined mass-to-charge-ratio width ΔM, and an MS/MS analysis is performed in each window in such a manner that all ions included within the mass-to-charge-ratio range of the window are collectively selected as precursor ions. In the present example, the mass-to-charge-ratio range ML-Mu is m/z 300-1500, and the mass-to-charge-ratio width ΔM is 20 Da. The entire mass-to-charge-ratio range for the measurement is completely covered by a total of 60 windows. Accordingly, the number of events is 60. For example, Event 2 is an MS/MS analysis in which all ions included within a mass-to-charge-ratio range of m/z 300-320 are collectively selected as precursor ions, while Event 3 is an MS/MS analysis in which all ions included within a mass-to-charge-ratio range of m/z 320-340 are collectively selected as precursor ions. Event 61 is an MS/MS analysis in which all ions included within a mass-to-charge-ratio range of m/z 1480-1500 are collectively selected as precursor ions.

After the DIA-MS/MS analysis, the DDA-MS/MS analysis is performed. The DDA-MS/MS analysis is performed so that a precursor ion specified in a DDA execution list is selected as the target (the procedure for creating the list will be described later). In the DDA analysis, the mass-to-charge-ratio width for ions to be selected by the quadrupole mass filter 26 is set to be significantly narrow, e.g., from 1 Da to 4 Da, as compared to the width in the DIA analysis (in the present example, 20 Da). In order to achieve a high degree of purity of the ultimately obtained MS/MS spectrum, the mass-to-charge-ratio width should preferably be as narrow as 1 Da. On the other hand, the range may be widened to around 4 Da when, for example, isotopic ion peaks having comparatively close mass-to-charge ratios should additionally be selected as precursor ions. In the present example, a total of 30 events are prepared for DDA-MS/MS analyses, allowing for the acquisition of high-purity MS/MS spectra for 30 different precursor ions. It should be noted that, unlike the DIA-MS/MS analysis, the DDA-MS/MS analysis will not be performed when there is no suitable precursor ion. Accordingly, the DDA-MS/MS analysis will not always be performed in every cycle.

FIG. 3 is a flowchart of the control-processing operation during the execution of one cycle of analyses in the LC-MS according to the present embodiment.

According to FIG. 3, a specific operation for the control and processing during an analysis is hereinafter described.

The MS1 analysis of Event 1 in one cycle is initially performed (Step S1), and a set of mass spectrum data covering the mass-to-charge-ratio range of ML-Mu is stored in the MS1 data storage area 410.

After the MS1 analysis, window #1 is set as the target of the DIA-MS/MS analysis (Step S2), and a DIA-MS/MS analysis in which the ions falling within the window are selected as precursor ions is performed (Step S3). Specifically, in Event 2 in FIG. 2, the quadrupole mass filter 26 allows ions within a mass-to-charge-ratio range of m/z 300-320 to pass through and be introduced into the collision cell 27 as precursor ions. Since the mass-to-charge-ratio width is comparatively wide, ions originating from different components may possibly be mixed in the precursor ions. However, those ions are collectively fragmented, and the resulting product ions are introduced into the time-of-flight mass separator and subjected to mass spectrometry. Consequently, a set of MS/MS spectrum data covering a predetermined mass-to-charge-ratio range is obtained for the precursor ions of m/z 300-320. This set of data is stored in the DIA data storage area 411.

After the DIA-MS/MS analysis for one window has been completed, it is determined whether or not the DIA-MS/MS analyses for all windows have been completed (Step S4). If all analyses have not yet been completed, the next window is set as the new target of the DIA-MS/MS analysis (Step S5), and the operation returns to Step S3. Accordingly, Steps S3 through S5 are repeated to perform all DIA-MS/MS analyses for Events 2 through 61. For example, a set of MS/MS spectrum data for which the ions included within a mass-to-charge-ratio range of m/z 320-340 are selected as precursor ions is collected in Event 3, while a set of MS/MS spectrum data for which the ions included within a mass-to-charge-ratio range of m/z 340-360 are selected as precursor ions is collected in the next Event 4. In Event 61, a set of MS/MS spectrum data for which the ions included within a mass-to-charge-ratio range of m/z 1480-1500 are selected as precursor ions is collected.

After the DIA-MS/MS analyses have been completed, a window-selecting operation is performed as follows. It should be noted that, as indicated by the broken line L in FIG. 3, the window-selecting operation does not always need to be performed after the DIA-MS/MS analyses for all windows have been completed; it may be performed every time a DIA-MS/MS analysis for one window has been completed.

Figure 4A:
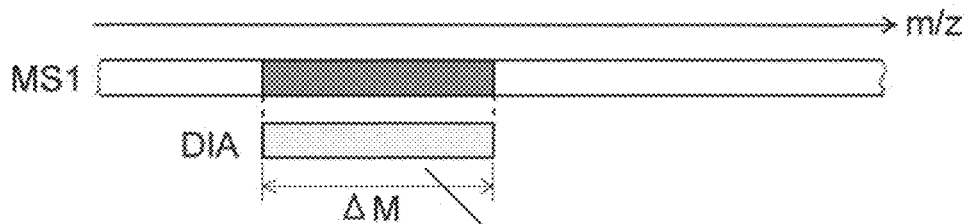
FIGS. 4A-4C are diagrams illustrating a window-selecting operation in the LC-MS according to the present embodiment.
Figure 4B:
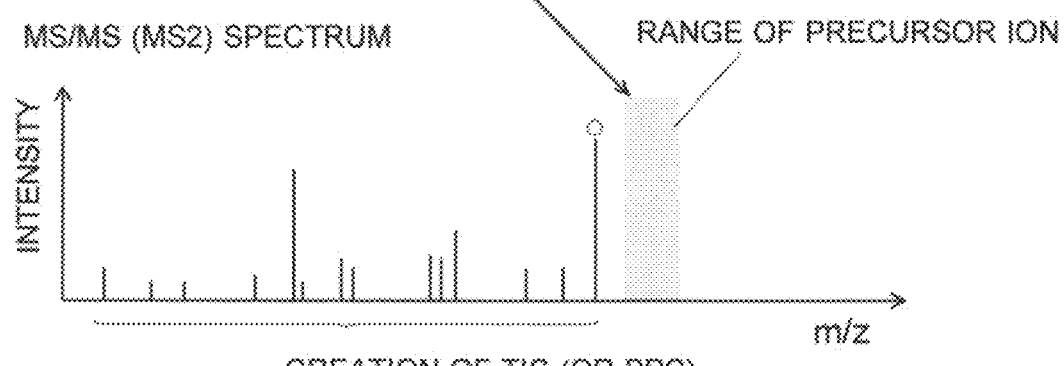
Figure 4C:
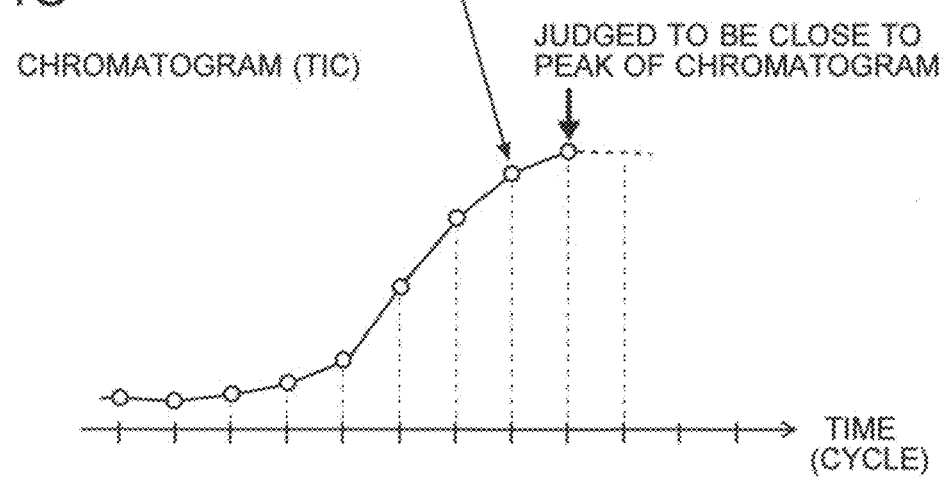

FIGS. 4A-4C are illustrations of the window-selecting operation in the LC-MS according to the present embodiment.

As shown in FIG. 4A, in the previously described DIA-MS/MS analysis, an MS/MS analysis in which precursor ions are selected from a partial mass-to-charge-ratio range in the entire mass-to-charge-ratio range to be covered by the measurement in the MS1 analysis is performed, and a set of data forming an MS/MS spectrum as shown in FIG. 4B is thereby obtained. In normal cases, in this MS/MS spectrum, the peaks originating from the product ions will appear within a mass-to-charge-ratio region lower than the mass-to-charge-ratio range of the precursor ions. Depending on the level of collision energy, some of the precursor ions may remain unchanged, in which case the peak of the remaining precursor ion will also be observed.

For each event, or for each window, the chromatogram creator 42 totals the signal intensities of all peaks observed on the MS/MS spectrum. The total of those signal intensities equals that of the intensities of the ions (product ions or precursor ions) originating from one or more components included in one window at the retention time concerned. Therefore, the total reflects the abundance of the one or more components. Its value is hereinafter called the "total ion current value" or "TIC value" (Step S6).

Since the TIC value is obtained for each window in one cycle, a series of TIC values are obtained with the repetition of the cycles. By arranging those TIC values in order of retention time, a chromatogram as shown in FIG. 4C can be created. This chromatogram shows a temporal change in TIC value in a predetermined mass-to-charge-ratio range. Accordingly, it can be considered as equivalent to the total ion chromatogram (TIC). When a new TIC value is obtained, the chromatogram creator 42 adds the new data to the already created TIC. Thus, the TIC curve created for each window is updated in almost real time with the progress of the LC/MS analysis (Step S7).

As soon as the TIC has been updated after the execution of the DIA-MS/MS analyses in one cycle, the DIA window selector 43 evaluates the peak waveform on the TIC according to a predetermined criterion to determine whether or not the latest position is close to the top of the peak on the TIC (Step S8).

There are various possible methods for defining the criterion for the determination. For example, a point in time at which the magnitude of the temporal change (increase) in the difference in total signal intensity between two successive cycles has been smaller than a predetermined threshold may be detected in order to recognize that the slope of the peak in the rising phase has changed from a steep to a gentle state. As another example, a point in time at which the difference in total signal intensity between two successive cycles has been zero or has changed its sign may be detected in order to recognize that the peak has arrived at or slightly passed through its top. In summary, what is essential is to enable determination on whether or not the current position is close to the peak top of the peak, regardless of the height of the peak (although an extremely low peak may be excluded).

The DIA window selector 43 performs the previously described determination based on the TIC obtained for each window and selects all windows which satisfy the predetermined criterion (Step S9). In FIG. 2, the three windows indicated by reference sign "B" are selected, based on the TIC shown in panel "A" (it should be noted that the TIC curves drawn in panel "A" in FIG. 2 include the portions which are not yet been obtained at this point in time).

Next, for each selected window, the precursor determiner 44 searches for a precursor-ion peak having the highest signal intensity among the peaks which are present within a mass-to-charge-ratio range that corresponds to the mass-to-charge-ratio range of the window in the MS1 spectrum (Step S10). The reason for the selection of the peak having the highest signal intensity is because the peak having the highest signal intensity can be considered to be the most noteworthy, or most significant peak in the window.

Figure 5:
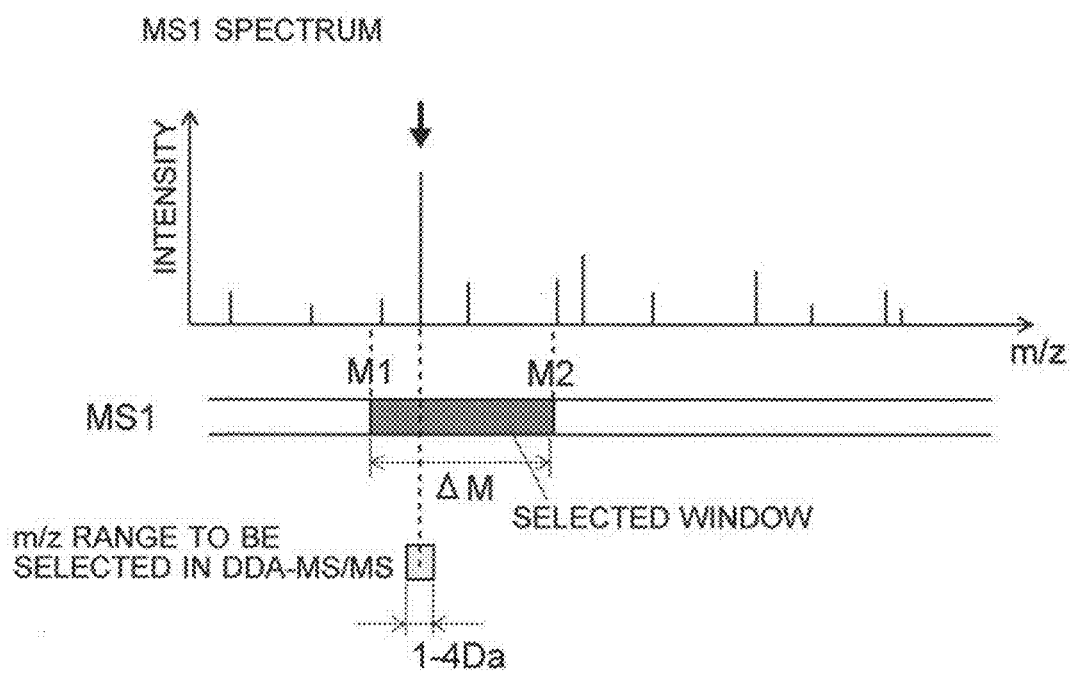
FIG. 5 is an illustration of a precursor-ion-selecting operation in the LC-MS according to the present embodiment.

FIG. 5 illustrates this precursor-ion-selecting operation. For example, suppose that the mass-to-charge-ratio range of the selected window is from M1 to M2, and that the M1 spectrum is as shown in FIG. 5. In this case, the peak indicated by the downward arrow in FIG. 5 is selected as the precursor-ion peak.

After the precursor-ion peaks have been similarly selected in all of the selected windows by the precursor determiner 44, the DDA execution list creator 45 prepares a DDA execution list in which the mass-to-charge ratios of the precursor ions are listed in descending order of the signal intensity of the selected precursor-ion peaks (Step S11).

Any of the previously described processing operations by the chromatogram creator 42, DIA window selector 43, precursor determiner 44 and DDA execution list creator 45 is a simple processing and requires a far shorter period of time than the period of time required for one execution of the MS/MS analysis. Accordingly, the period of time from the completion of the DIA-MS/MS analyses for all windows to the completion of the creation of the DDA execution list based on the result of those analyses is practically ignorable. It should be understood from the earlier note that the processing operations by the chromatogram creator 42, DIA window selector 43 and precursor determiner 44 do not need to be performed after the completion of all DIA-MS/MS analyses; those operations may be performed every time an MS/MS spectrum has been acquired through one DIA-MS/MS analysis.

The DDA execution list creator 45 gives the created DDA execution list to the analysis controller 40. The analysis controller 40 sequentially performs MS/MS analyses for the precursor ions in the DDA execution list in order of priority (Step S12). The mass-to-charge ratios of the precursor ions in the DDA execution list have precise values which are calculated to four decimal places, for example. However, as explained earlier, the mass-to-charge-ratio width for allowing ions to pass through the quadrupole mass filter 26 in the DDA-MS/MS analysis should preferably be as wide as 1-4 Da.

In the present example, as noted earlier, there 30 events prepared for DDA-MS/MS analyses, allowing for the acquisition of MS/MS spectra for a maximum of 30 precursor ions. If the number of precursor ions in the DDA execution list is greater than the maximum number, the DDA-MS/MS analyses can be discontinued at the maximum number.

As one example, consider the case where the period of time required for the MS1 analysis is 5 msec, the period of time required for one DIA-MS/MS analysis is 5 msec, and the period of time required for one DDA-MS/MS analysis is 10 msec. Additionally, suppose that the number of events for the DIA-MS/MS analysis is 60, and the number of events for the DDA-MS/MS analysis is 30, as already mentioned. The period of time for the DDA-MS/MS analysis is set to be longer than the period of time for the DIA-MS/MS analysis since the DDA MS/MS analysis needs a greater number of scans to increase the number of times of the accumulation of the spectrum and thereby improve the accuracy of the spectrum. It may be possible to allot the same period of time to the DIA-MS/MS analysis and the DDA-MS/MS analysis.

In the aforementioned example, the period of time for one cycle (loop time) is 0.605 sec. In other words, for example, when an extracted ion chromatogram is created from the result of the DIA-MS/MS analysis, the time interval of the data (sampling period) will be 0.605 sec. In general, when the concentration (abundance) of a component needs to be calculated with a high level of quantitative performance from a peak on a chromatogram, there must be approximately 10 or more data points in the peak. A peak obtained with a commonly used liquid chromatograph typically has a width of several seconds. Accordingly, a sufficient number of data points for ensuring a high level of quantitative performance can be achieved with the aforementioned loop time.

It is also possible to control the period of time allotted to each event, or to control the number of events in the DDA-MS/MS analysis, depending on the loop time.

By the LC-MS according to the present embodiment, an MS/MS spectrum which completely covers the entire mass-to-charge-ratio range for the measurement can be obtained by the DIA-MS/MS analysis. Therefore, the product-ion information which originates from almost all components (compounds) contained in the sample can be collected, and a high level of exhaustiveness can be achieved. On the other hand, even when there is a significant difference in quantity among the plurality of component contained in the sample, an MS/MS spectrum by DDA can be acquired for ions originating from each component at a point in time where the amount of that component in the eluate is comparatively high. Accordingly, for a component which is considered to be significant in the sample, a high-quality MS/MS spectrum with a high degree of purity and high level of signal intensity can be obtained, so that the accuracy of the qualitative and quantitative determination of the component can be improved.

Modified Examples

In the LC-MS according to the previous embodiment, the TIC obtained for each window is used for the selection of a window. A base peak chromatogram (BPC) may be used in place of the TIC, or any other type of chromatogram substitutable for TIC or BPC may be used. The calculation of the TIC value from an MS/MS spectrum may exclude the precursor ion instead of using the signal intensities of all peaks observed in the MS/MS spectrum. Ion peaks having mass-to-charge ratios corresponding to known components which are not the target of the analysis may also be excluded from the calculation of the TIC value. For example, components which originate from the mobile phase used in the LC unit 1A or from known kinds of foreign substances may be excluded.

Similarly, the process of determining a precursor ion for each window may include the step of excluding the aforementioned type of ion peaks having mass-to-charge ratios corresponding to known components which are not the target of the analysis before the selection of the peak having the highest signal intensity, rather than simply selecting the peak having the highest signal intensity within the mass-to-charge-ratio range corresponding to the window. It is possible to select a plurality of precursor ions from one window as the targets of the DDA-MS/MS analysis depending on the signal intensity or other conditions, instead of selecting a single precursor ion from one window. In the process of creating the DDA execution list, the priority of each precursor ion to be listed may be determined based on the TIC value in the window corresponding to the precursor ion, or any other appropriate index, in place of the signal intensity of the precursor ion.

In the previous embodiment, a chromatogram is created for each window, based on the intensity information of each ion appearing in the MS/MS spectrum acquired by the DIA-MS/MS analysis. It is also possible to select a window without creating a chromatogram. In that case, for example, every time an MS/MS spectrum corresponding to one window has been acquired, it is determined whether or not the signal intensity of a predetermined ion (e.g., the base peak having the highest signal intensity) in the MS/MS spectrum exceeds a predetermined threshold, or whether or not the total of the signal intensities of a plurality of ions in the MS/MS spectrum exceeds a predetermined threshold. A window which has exceeded the threshold can be selected as a window in which the DDA-MS/MS analysis should be performed (i.e., in which a precursor ion should be selected).

As a matter of course, the various numerical values used in the previous descriptions, such as the mass-to-charge-ratio range for the measurement or mass-to-charge-ratio width of the windows, are mere examples and can be appropriately changed.

In the LC-MS according to the previous embodiment, a Q-TOF mass spectrometer is used as the mass spectrometry section 1B. A different type of tandem mass spectrometer capable of an MS/MS analysis may also be used, such as a triple quadrupole mass spectrometer, ion trap time-of-flight mass spectrometer, or ion trap mass spectrometer. However, the Q-TOF mass spectrometer is preferable from various viewpoints, such as the mass accuracy, mass-resolving power and other kinds of performance as well as the analysis speed.

Although a liquid chromatograph is used as the chromatograph in the previous embodiment, it is evident that the present invention can also be applied in a gas chromatograph mass spectrometer.

The previously described embodiment and its modified examples are mere examples of the present invention. Any change, modification or addition appropriately made within the spirit of the present invention will evidently fall within the scope of claims of the present application.

[Various Modes]

It is evident for a person skilled in the art that the previously described illustrative embodiment is a specific example of the following modes of the present invention.

(Clause 1) One mode of the chromatograph mass spectrometer according to the present invention includes:
  a measurement unit in which a chromatograph and a tandem mass spectrometry section capable of an MS/MS analysis are combined together;
  a controller configured to perform a chromatograph mass spectrometric analysis by controlling the measurement unit so as to operate the tandem mass spectrometry section to cyclically perform analyses cycles, where each of the analysis cycles includes at least a first mass spectrometric analysis in which a measurement of ions is performed over a predetermined mass-to-charge-ratio range and an MS/MS analysis by data independent acquisition in which ions included within each of a plurality of windows formed by dividing the mass-to-charge-ratio range are designated as a precursor ion;

a window selector configured to select, during an execution of an analysis cycle, a window among the plurality of windows for an MS/MS analysis by data dependent acquisition which is irregularly performed in an ongoing analysis cycle, based on intensity information obtained for each of the plurality of windows from an MS/MS spectrum acquired by the MS/MS analysis by data independent acquisition;

a precursor-ion determiner configured to determine a precursor ion corresponding to the window selected by the window selector in a mass spectrum acquired by the first mass spectrometric analysis in the ongoing analysis cycle, based on peak information included within the mass-to-charge-ratio range of the window; and a data-dependent-acquisition condition setter configured to inform the controller of the precursor ion determined by the precursor-ion determiner, as the precursor ion for the MS/MS analysis by data dependent acquisition which is irregularly performed in the ongoing analysis cycle.

By the device described in Clause 1, an MS/MS spectrum with a high degree of purity and high level of sensitivity can be obtained even for a component whose abundance in the sample is comparatively low. Furthermore, by the device described in Clause 1, an MS/MS spectrum for each of the windows which assuredly cover the entire mass-to-charge-ratio range for the measurement can be obtained even when a constraint is placed on the analysis speed of the tandem mass spectrometry section for some reasons, e.g., in order to fulfill the requirement that a chromatogram which ensures a satisfactory level of quantitative performance can be obtained. That is to say, the device described in Clause 1 can acquire a high-quality MS/MS spectrum with a high degree of purity while achieving a high level of exhaustiveness.

(Clause 2) In the device described in Clause 1, the precursor-ion determiner may be configured to select, as the precursor ion corresponding to the window selected by the window selector, a peak having the highest signal intensity among the peaks included within the mass-to-charge-ratio range of the window in the mass spectrum acquired by the first mass spectrometric analysis.

By the device described in Clause 2, when there are a plurality of peaks within the mass-to-charge-ratio range of one window in a mass spectrum, a peak which is likely to be the most significant peak among those peaks can be selected as the precursor ion for the MS/MS analysis by DDA. This assuredly enables acquisition of a high-quality MS/MS spectrum for a component which is considered to be significant when a large number of components are contained in the sample.

(Clause 3) In the device described in Clause 2, the data-dependent-acquisition condition setter may be configured to instruct the controller to prioritize the execution of the MS/MS analysis by data dependent acquisition in descending order of the signal intensity of the determined precursor ion.

In the device described in Clause 3, when a plurality of components are insufficiently separated from each other in the temporal direction and are introduced into the mass spectrometry section in a superposed form, a component which is abundantly present and is therefore considered to be an important component can be prioritized in the acquisition of the MS/MS spectrum by DDA.

(Clause 4) In the device described in one of Clauses 1-3, the device may further include a chromatogram creator configured to create a chromatogram for each of the plurality of windows during an execution of an analysis cycle, based on intensity information obtained from an MS/MS spectrum acquired by the MS/MS analysis by data independent acquisition, and the window selector may be configured to select a window among the plurality of windows in which the MS/MS analysis by data dependent acquisition should be performed in the ongoing analysis cycle, based on the chromatogram created for each of the plurality of windows by the chromatogram creator.

As for the chromatogram created for each window, a total ion chromatogram or base peak chromatogram can be used, for example.

In the device described in Clause 4, as soon as the MS/MS analysis by DIA in one cycle has been completed, the window selector creates a chromatogram showing the temporal change in intensity information for each window, from the intensity information obtained from the MS/MS spectrum acquired for one window and the intensity information obtained from the MS/MS spectrum acquired for the same window by the MS/MS analysis by DIA in the foregoing cycles. The chromatogram obtained for one window reflects a temporal change in the concentration (abundance) of a component from which an ion species whose mass-to-charge ratio is included within that window is produced. Accordingly, for example, based on the waveform of a peak which appears in the chromatogram created for each window, the window selector selects a window as the target of the MS/MS analysis by DDA in the same cycle.

Thus, the device described in Clause 4 can acquire a high-purity MS/MS spectrum by DDA at an appropriate timing based on a temporal change in the ion intensity in each window, i.e., at a timing at which the concentration of the component included within the window is comparatively high.

(Clause 5) In the device described in Clause 4, the window selector may be configured to select a window among the plurality of windows as the window in which the MS/MS analysis by data dependent acquisition should be performed in the ongoing analysis cycle, when a peak appearing on the chromatogram created for the window is at a phase immediately before the peak top, corresponding to the peak top, or immediately after the peak top.

The device described in Clause 5 can acquire an MS/MS spectrum by DDA for each component in a sample at or close to the timing at which the abundance of the component is highest in the eluate, regardless of the abundance of the other components. Accordingly, a high-quality MS/MS spectrum with a high level of signal intensity can be obtained.

REFERENCE SIGNS LIST

1 . . . Measurement Unit
1A . . . Liquid Chromatograph Section (LC Section)
10 . . . Mobile Phase Container
11 . . . Liquid Supply Pump
12 . . . Injector
13 . . . Column
1B . . . Mass Spectrometry Section (MS Section)
20 . . . Vacuum Chamber
201 . . . Ionization Chamber
202 . . . First Intermediate Vacuum Chamber 203 . . . Second Intermediate Vacuum Chamber
204 . . . First High Vacuum Chamber
205 . . . Second High Vacuum Chamber
21 . . . Electrospray Ionization (ESI) Probe
22 . . . Desolvation Tube
23 . . . Ion Guide
24 . . . Skimmer
25, 28, 29 . . . Ion Guide
26 . . . Quadrupole Mass Filter
27 . . . Collision Cell
28 . . . Ion Guide
30 . . . Orthogonal Accelerator
31 . . . Ion Flight Section
32 . . . Ion Detector
4 . . . Control-Processing Unit
40 . . . Analysis Controller
41 . . . Data Storage Section
410 . . . MS1 Data Storage Area
411 . . . DIA Data Storage Area
412 . . . DDA Data Storage Area
42 . . . Chromatogram Creator
43 . . . DIA Window Selector
44 . . . Precursor Detector
45 . . . DDA Execution List Creator
5 . . . Input Unit
6 . . . Display Unit

The invention claimed is:

1. A chromatograph mass spectrometer comprising:
a measurement unit in which a chromatograph and a tandem mass spectrometry section capable of an MS/MS analysis are combined together;
a controller configured to perform a chromatograph mass spectrometric analysis by controlling the measurement unit so as to operate the tandem mass spectrometry section to cyclically perform analysis cycles, where each of the analysis cycles includes at least a first mass spectrometric analysis in which a measurement of ions is performed over a predetermined mass-to-charge-ratio range and an MS/MS analysis by data independent acquisition in which ions included within each of a plurality of windows formed by dividing the mass-to-charge-ratio range are designated as a precursor ion;
a window selector configured to select, during an execution of an analysis cycle, a window among the plurality of windows for an MS/MS analysis by data dependent acquisition which is irregularly performed in an ongoing analysis cycle, based on intensity information obtained for each of the plurality of windows from an MS/MS spectrum acquired by the MS/MS analysis by data independent acquisition;
a precursor-ion determiner configured to determine a precursor ion corresponding to the window selected by the window selector in a mass spectrum acquired by the first mass spectrometric analysis in the ongoing analysis cycle, based on peak information included within a mass-to-charge-ratio range of the window; and
a data-dependent-acquisition condition setter configured to inform the controller of the precursor ion determined by the precursor-ion determiner, as the precursor ion for the MS/MS analysis by data dependent acquisition which is irregularly performed in the ongoing analysis cycle.

2. The chromatograph mass spectrometer according to claim 1, wherein the precursor-ion determiner is configured to select, as the precursor ion corresponding to the window selected by the window selector, a peak having a highest signal intensity among peaks included within the mass-to-charge-ratio range of the window in the mass spectrum acquired by the first mass spectrometric analysis.

3. The chromatograph mass spectrometer according to claim 2, wherein the data-dependent-acquisition condition setter is configured to instruct the controller to prioritize an execution of the MS/MS analysis by data dependent acquisition in descending order of signal intensity of the determined precursor ion.

4. The chromatograph mass spectrometer according to claim 1, further comprising a chromatogram creator configured to create a chromatogram for each of the plurality of windows during an execution of an analysis cycle, based on intensity information obtained from an MS/MS spectrum acquired by the MS/MS analysis by data independent acquisition, wherein the window selector is configured to select a window among the plurality of windows in which the MS/MS analysis by data dependent acquisition should be performed in the ongoing analysis cycle, based on the chromatogram created for each of the plurality of windows by the chromatogram creator.

5. The chromatograph mass spectrometer according to claim 4, wherein the window selector is configured to select a window among the plurality of windows as a window in which the MS/MS analysis by data dependent acquisition should be performed in the ongoing analysis cycle, when a peak appearing on the chromatogram created for the window is at a phase immediately before a peak top, corresponding to the peak top, or immediately after the peak top.

* * * * *